US010853649B2

United States Patent
Iyer et al.

(10) Patent No.: US 10,853,649 B2
(45) Date of Patent: Dec. 1, 2020

(54) CONTEXT-AWARE HAZARD DETECTION USING WORLD-FACING CAMERAS IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/113,007

(22) Filed: Aug. 27, 2018

(65) Prior Publication Data
US 2020/0065584 A1 Feb. 27, 2020

(51) Int. Cl.
*G06T 7/70* (2017.01)
*G06T 19/00* (2011.01)
*G06T 7/579* (2017.01)
*G06K 9/00* (2006.01)

(52) U.S. Cl.
CPC .......... *G06K 9/00671* (2013.01); *G06T 7/579* (2017.01); *G06T 7/70* (2017.01); *G06T 19/006* (2013.01); *G06T 2207/10048* (2013.01); *G06T 2207/30244* (2013.01)

(58) Field of Classification Search
CPC ......... G06T 19/006; G06T 7/579; G06T 7/70; G06K 9/00671
USPC ........................................................ 701/510
See application file for complete search history.

(56) References Cited

U.S. PATENT DOCUMENTS

| | | | |
|---|---|---|---|
| 10,127,731 B1* | 11/2018 | Ozery | G06T 19/006 |
| 2004/0167667 A1* | 8/2004 | Goncalves | G01C 21/12 700/245 |
| 2013/0328928 A1* | 12/2013 | Yamagishi | G02B 27/017 345/633 |
| 2015/0094142 A1* | 4/2015 | Stafford | G06F 3/04815 463/31 |
| 2015/0262429 A1* | 9/2015 | Shuster | G06F 16/245 345/633 |

(Continued)

FOREIGN PATENT DOCUMENTS

CN 106548519 A * 3/2017

*Primary Examiner* — Mark K Zimmerman
*Assistant Examiner* — Jonathan M Cofino
(74) *Attorney, Agent, or Firm* — Fogarty LLP

(57) ABSTRACT

Systems and methods for alerting a user to safety hazards in real-world while the user is wearing a Head-Mounted Display (HMD). In some embodiments, an Information Handling System (IHS) may include: a processor; and a memory coupled to the processor, the memory having program instructions stored thereon that, upon execution by the processor, cause the IHS to: receive an image during execution of a xR application displayed to a user wearing a Head-Mounted Display (HMD) coupled to the IHS; detect an object in the image; associate the object with a landmark selected among a plurality of landmarks usable by the xR application to determine a position of the HMD; and provide to the user, via the HMD, a safety instruction related to the object in response to a distance between the HMD and the selected landmark meeting a distance threshold.

19 Claims, 6 Drawing Sheets

(56) References Cited

U.S. PATENT DOCUMENTS

| | | | |
|---|---|---|---|
| 2015/0304634 A1* | 10/2015 | Karvounis | H04N 13/239 |
| | | | 348/46 |
| 2017/0072851 A1* | 3/2017 | Shenoy | B60Q 9/008 |
| 2017/0206692 A1* | 7/2017 | Sheaffer | G06T 11/60 |
| 2017/0287217 A1* | 10/2017 | Kim | B62J 27/00 |
| 2017/0287218 A1* | 10/2017 | Nuernberger | G06T 19/006 |
| 2017/0374342 A1* | 12/2017 | Zhao | G01B 11/2518 |
| 2018/0075302 A1* | 3/2018 | Udell | G06K 9/00671 |
| 2018/0299271 A1* | 10/2018 | Calloway | G01C 21/005 |
| 2018/0349728 A1* | 12/2018 | Wang | G06K 9/6202 |

* cited by examiner

CONTEXT-AWARE HAZARD DETECTION USING WORLD-FACING CAMERAS IN VIRTUAL, AUGMENTED, AND MIXED REALITY (XR) APPLICATIONS

FIELD

The present disclosure generally relates to Information Handling Systems (IHSs), and, more particularly, to systems and methods for providing context-aware hazard detection using world-facing cameras in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for providing context-aware hazard detection using world-facing cameras in virtual, augmented, and mixed reality (xR) applications are described. In an illustrative, non-limiting embodiment, an Information Handling System (IHS) may include: a processor; and a memory coupled to the processor, the memory having program instructions stored thereon that, upon execution by the processor, cause the IHS to: receive an image during execution of a xR application displayed to a user wearing a Head-Mounted Display (HMD) coupled to the IHS; detect an object in the image; associate the object with a landmark selected among a plurality of landmarks usable by the xR application to determine a position of the HMD; and provide to the user, via the HMD, a safety instruction related to the object in response to a distance between the HMD and the selected landmark meeting a distance threshold.

In some cases, image may be received from a World-Facing (WF) camera mounted on the HMD. The selected landmark may be detected using an Infra-Red (IR) or near-IR (NIR) camera decoupled from the HMD. The object may be detected in the image using a feature extraction process. One or more extracted features may match one or more corresponding features of an object model stored in a database. The database may indicate, for each stored object model, an associated severity value, and providing the safety instruction may include rendering a frame for display by the HMD corresponding to a severity value associated with the object.

The program instructions, upon execution, may cause the IHS to track a height of the object relative to the ground based upon the selected landmark. In that case, the severity value may be proportional to the height. Additionally, or alternatively, the program instructions may cause the IHS to track a speed of the object based upon the selected landmark. In that case, the severity value may be proportional to the speed.

Additionally, or alternatively, the program instructions may cause the IHS to, in response to an IHS resource utilization reaching a predetermined value, reduce the number of landmarks used to determine the position of the HMD. The program instructions may also cause the IHS to maintain the selected landmark among the used landmarks in response to the severity value being above a safety threshold. In some cases, rendering the frame may include providing a feed of camera frames from the WF camera to a display within the HMD.

In another illustrative, non-limiting embodiment, a hardware memory device may have program instructions stored thereon that, upon execution by an HMD worn by a user during execution of an xR application, cause the HMD to: detect an object in a frame captured by a camera mounted on the HMD; associate the object with a Simultaneous Localization and Mapping (SLAM) landmark; and display a safety instruction related to the object in response to a distance between the SLAM landmark and the HMD meeting a threshold.

The detected object may be associated with a severity value, and displaying the safety instruction further may include selecting an image corresponding to a severity value associated with the detected object. The program instructions may also cause the IHS to: in response to a resource utilization reaching a maximum, reduce the number of landmarks used to determine the position of the HMD; determine that a given landmark has a low confidence value; and maintain the given landmark among the used landmarks in response to a severity value of the landmark being above a safety threshold.

In yet another illustrative, non-limiting embodiment a method may include: receiving a frame from a camera mounted on an HMD worn by a user; associating an object detected in the frame with a SLAM landmark extracted from an IR image; and providing to the user, via the HMD, a safety instruction in response to a distance between the user and the SLAM landmark meeting a threshold. The method may also include tracking a height or speed of the detected object using the SLAM landmark; associating a severity value with the object based upon the height or speed; and providing a notification to the user corresponding to the severity value.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for context-aware hazard detection using world-facing cameras in virtual, augmented, and mixed reality (xR) applications. These techniques are particularly useful in xR applications that employ HMDs, Heads-Up Displays (HUDs), and eyeglasses—collectively referred to as "HMDs."

Figure 1:
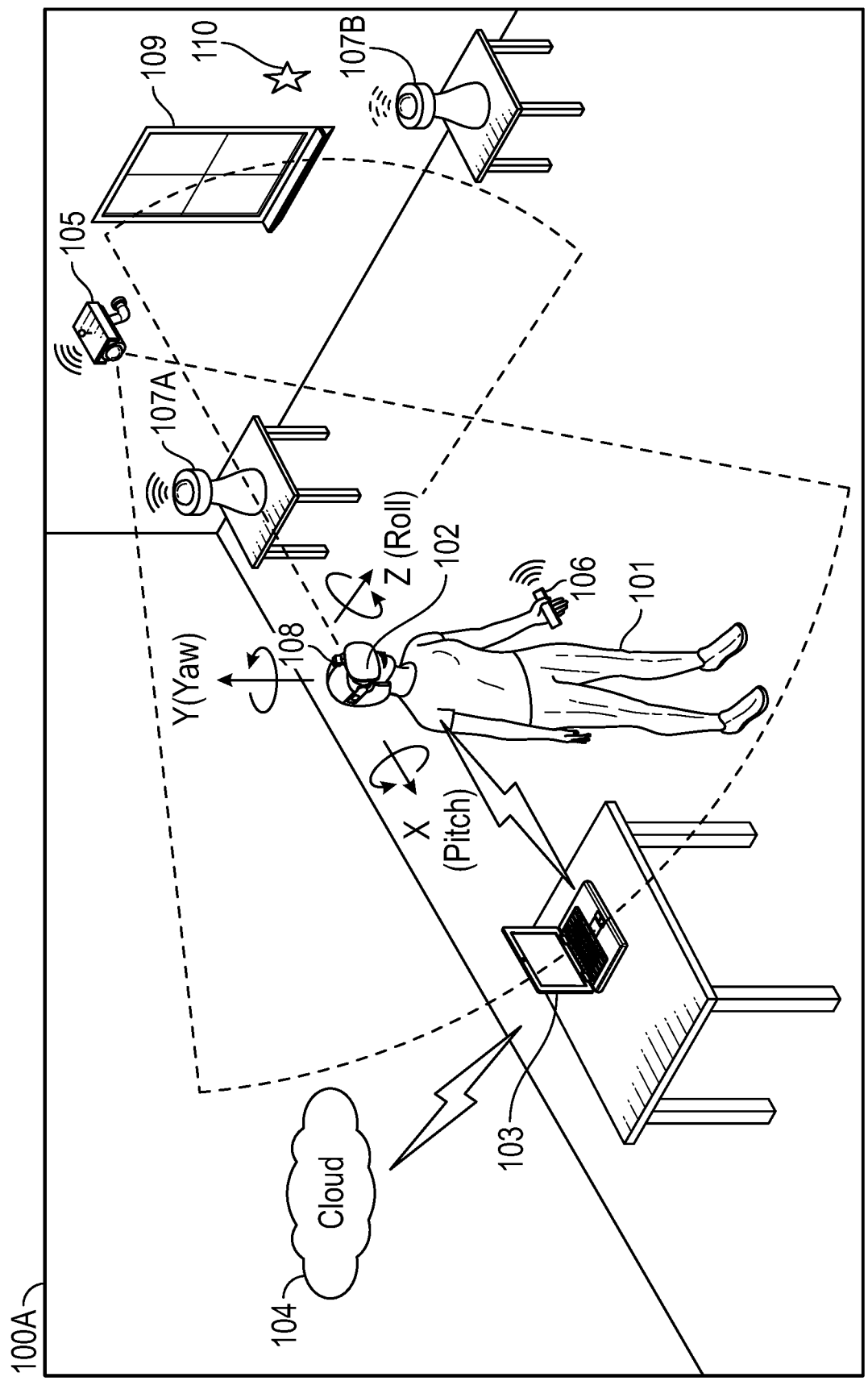
FIG. 1 illustrates an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective. In other embodiments, however, HMD 102 may be an All-In-One (MO) device where all processing is done by HMD 102 itself (and host IHS 103 may be absent).

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Figure 2:
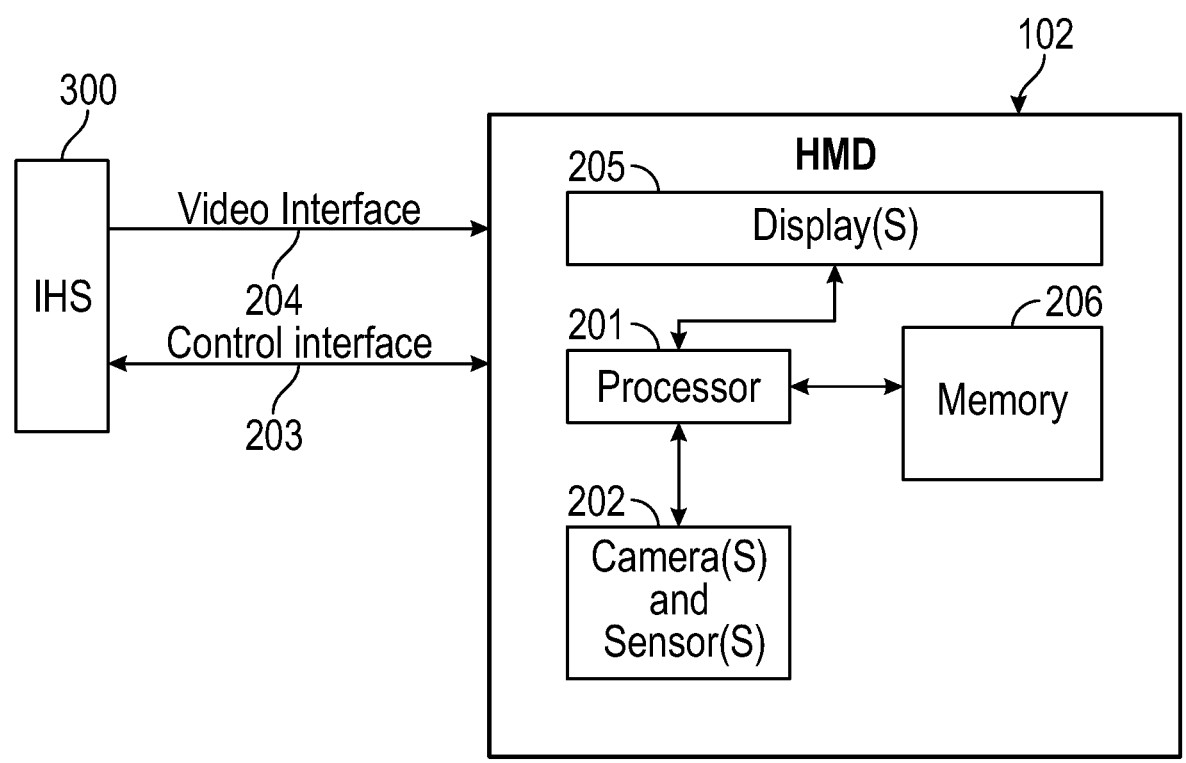
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out cameras, eye tracking cameras, RGB cameras, IR cameras, etc. Meanwhile, examples of sensor(s) 202 include, but are not limited to: RGB cameras, infrared (IR) cameras, electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub, or the like.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide a communication channel between processor 201 and IHS 300 to facilitate execution of an xR application. For example, program instructions stored in memory 206, when executed by processor 201, may cause video frames captured by camera(s) 202 to be transmitted to IHS 300 via control interface 203.

IHS 300 may in turn execute SLAM module 403 (FIG. 4), for example, based upon landmarks found in the video frames received from HMD 102 (or from outside-in camera 105). Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to display(s) 205 via video interface 204 (e.g., HDMI, DVI, DISPLAYPORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
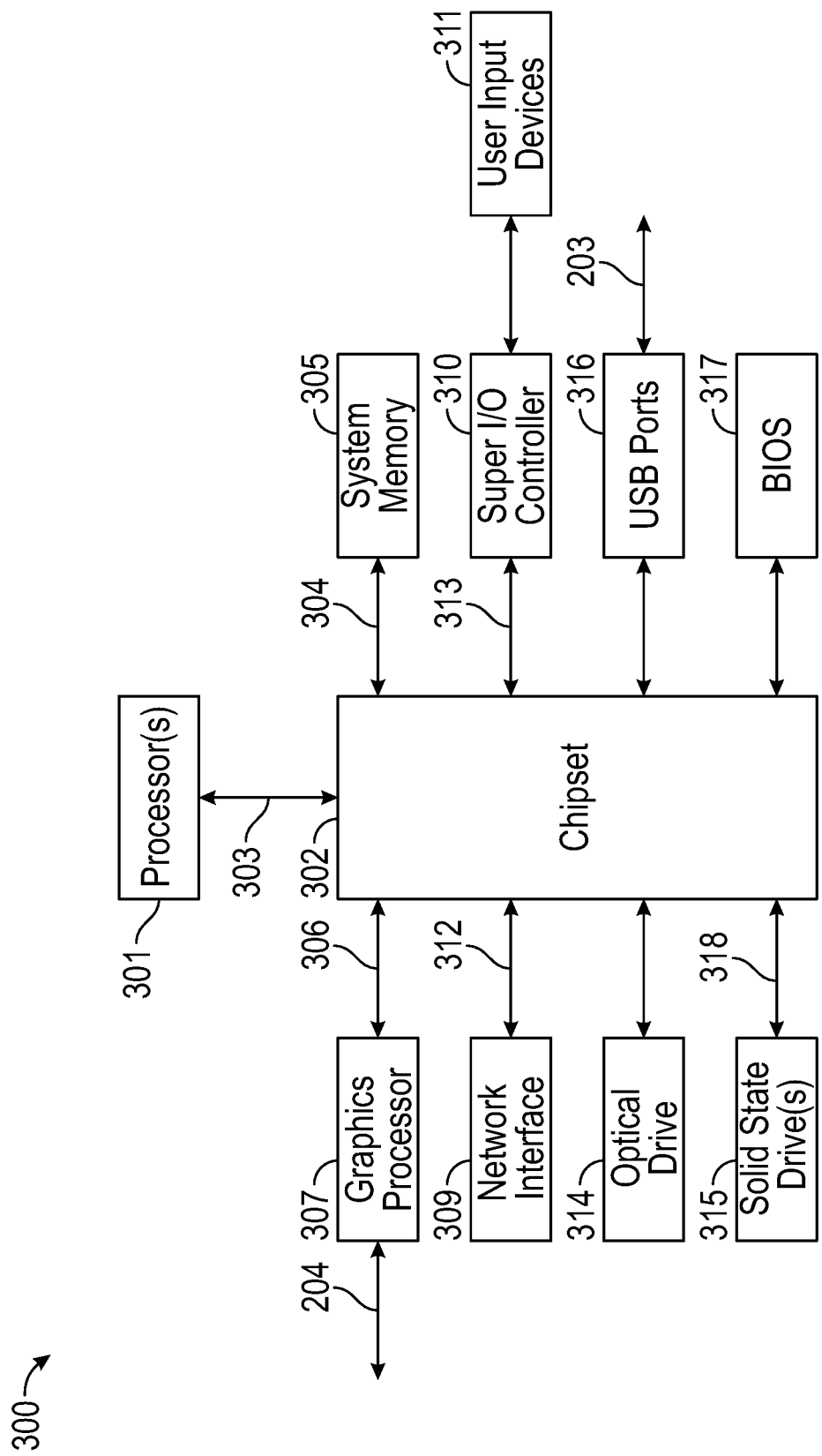
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connected to processor(s) 301. In certain embodiments, chipset 302 may utilize Quick-Path Interconnect (QPI) bus 303 for communicating with processor(s) 301. Chipset 302 provides processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of the IHS 300. Graphics processor 307 may be coupled to chipset 302 via graphics bus 306 such as provided by an Accelerated Graphics Port (AGP) bus or a Peripheral Component Interconnect Express (PCIe) bus. In certain embodiments, graphics processor 307 generates display signals and provides them to HMD 102 via video interface 204 (e.g., HDMI, DVI, DISPLAYPORT, etc.).

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to super I/O controller 310 via a Low Pin-Count (LPC) bus 313.

Other resources may also be coupled to processor(s) 301 of IHS 300 through chipset 302. In certain embodiments, chipset 302 may be coupled to network interface 309, such as provided by a Network Interface Controller (NIC) that is coupled to IHS 300. In certain embodiments, network interface 309 may be coupled to chipset 302 via PCIe bus 312.

According to various embodiments, network interface 309 may support communication via various wired and/or wireless networks. In certain embodiments, chipset 302 may also provide access to one or more Universal Serial Bus (USB) ports 316; which in some implementations may serve as transport for establishing control interface 203 with HMD 102.

Chipset 302 also provides access to one or more solid-state storage devices 315. Chipset 302 utilizes PCIe bus interface connection 318 in order to communication with the solid-state storage device 315. In certain embodiments, chipset 302 may also provide access to other types of storage devices. For instance, in addition to the solid-state storage device 315, IHS 300 may also utilize one or more magnetic disk storage devices, or other types of the storage devices such as an optical drive or a removable-media drive. In various embodiments, solid-state storage device 315 may be integral to IHS 300, or may be located remotely from IHS 300.

Another resource that may be accessed by processor(s) 301 via chipset 302 is Basic Input/Output System (BIOS) 317. Upon powering or restarting IHS 300, processor(s) 301 may utilize BIOS 317 instructions to initialize and test hardware components coupled to the IHS 300 and to load an operating system for use by the IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to the IHS 300. The Unified Extensible Firmware Interface (UEFI) was designed as a successor to BIOS. As used herein, the term "BIOS" is intended to also encompass UEFI.

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by illustrated components may instead be provided by components integrated into the one or more processor(s) as a system-on-a-chip (SOC) or the like.

Figure 4:
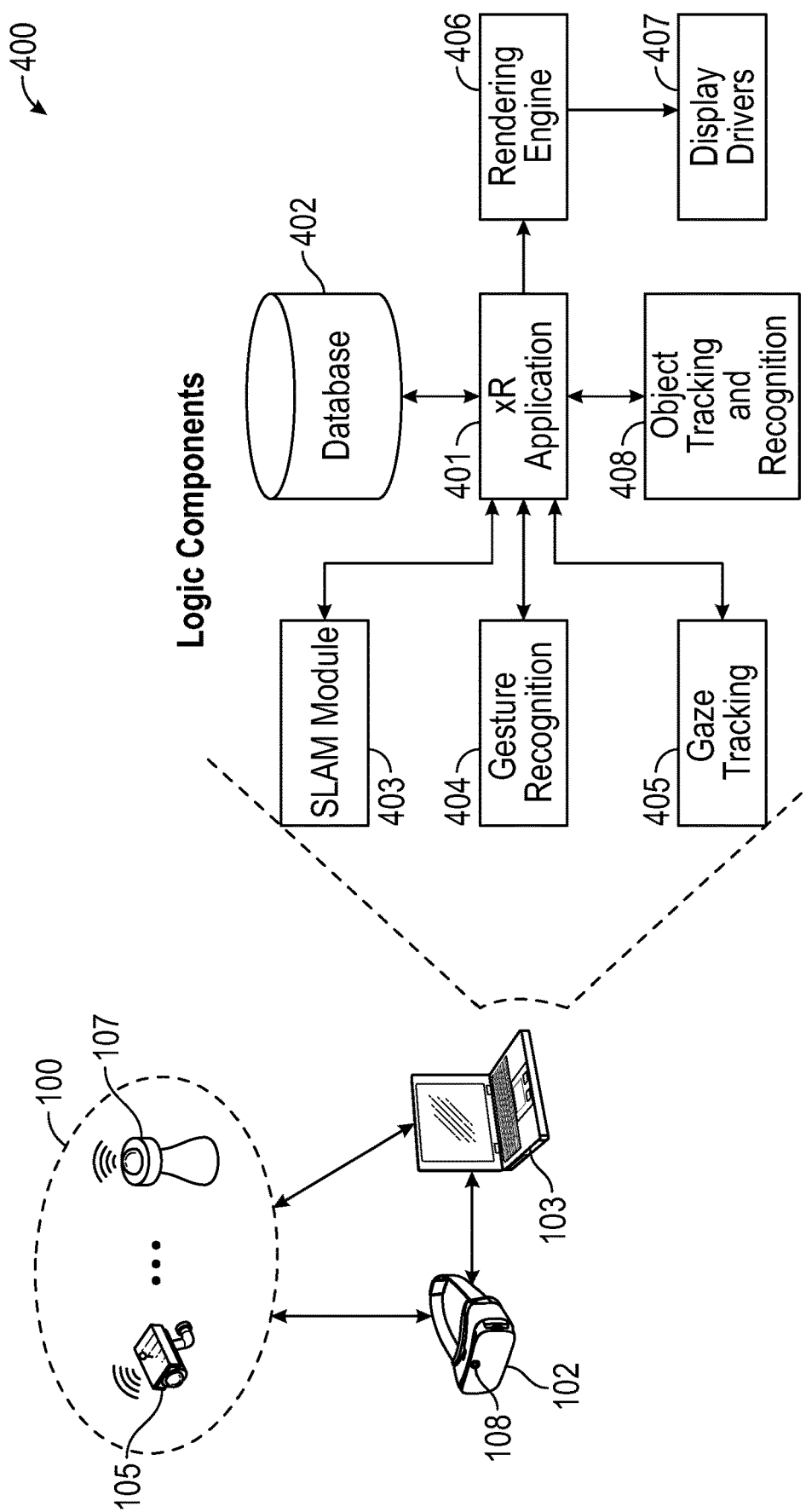
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, therapy, education and training, military uses, occupational safety, engineering, industrial product design, collaboration applications, virtual meetings, etc. These applications may be provided, at least in part, through the execution of program instructions stored, for example, in system memory 305 of host IHS 103.

In operation, SLAM module 403 uses positional tracking devices among camera(s) and sensor(s) 202 to construct a map of an unknown environment where HMD 102 is located, and that simultaneously identifies where HMD 102 is located, its orientation, and/or pose.

Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100 and/or one or more totems 106 (e.g., any UI device, such as a pointer, a DELL dial totem, or the like) or tags 110 (e.g., any passive or active object) that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, world-facing (WF) camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In other cases, markerless inside-out tracking may use continuous searches and feature extraction techniques from video frames obtained by WF camera 108 (e.g., using visual odometry) to find visual landmarks (e.g., window 109) in environment 100.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., WF camera 108 observes landmarks in the environment that have been previously mapped). In other cases, a map of environment 100 may be obtained, at least in part, from cloud 104.

In some cases, the consumption of host hardware resources (e.g., CPU, GPU, memory, etc.) during operation of a SLAM method may be dependent upon the order or dimension of a square covariance matrix of landmark data (or other features extracted from sensor data). In various embodiments, a SLAM method may reduce resource utilization on host IHS 103, at least in part, by: sorting or ranking detected landmarks by their respective Kalman gains (e.g., in order from largest to smallest value of "G", which in turn indicates a confidence or probability of the landmark's measured location being accurate); generating a cutoff (e.g., compute load) using the calibration data; and employing only a selected subset of all available landmarks to generate covariance matrices to be used by the SLAM method thereafter (e.g., using only top n landmarks with highest G values).

Gesture recognition module 404 may use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when RGB video frame data (e.g., a video or depth-video stream) is received at host IHS 103 from WF camera 108 (or another dedicated gesture camera) of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using WF camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other embodiments, the use of a virtual skeleton may not be necessary. For example, in other implementations, raw point-cloud data may be sent directly to a feature extraction routine within a gesture recognition module.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest (ROI or ROGI) of configurable size or shape (e.g., circular, rectangular, etc.) based upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model displayed by HMD 102 from user 101's unique point-of-view based upon the user's coordinate location (e.g., from SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

As xR HMDs become more mobile and their range of operation increases, the need to recognize and track real-world, physical objects within environment 100, also increases. For example, a mobile user operating remotely in a markerless environment (e.g., an open landscape) may need to recognize and to monitor objects that can present a danger or safety hazard. In these cases, the objects may likely have no relation to the HMD user's workflow, therefore any conscious attention taken to monitor the object is at the expense of other activities.

In many cases, a user may be unable to recognize or to track certain objects without some form of assistance from HMD 102. The relative position between the user and the object may change over time—the user may be in motion towards or away from the object, or the object may change its position relative to a stationary user. The ability to assist with tracking and warning for potential safety hazards (e.g., a user tripping over an object on the floor, spilling a glass of water, running into a coffee table, etc.) is particularly useful in this type of setting.

To address these types of problems, xR application 401 may use database 402 (a calibration and object recognition database store or "ORDB 402") to assign a value of criticality or priority to certain real-world objects. These real-world objects may be detected or identified by applying image processing techniques to video frames captured using RGB camera 108 mounted on HMD 102. In some cases, one or more remote IHSs accessible via cloud 104 may serve as a storage extension of ORDB 402.

Once detected, real-world objects may be correlated to SLAM landmarks obtained by SLAM module 403 in a SLAM-mapped space. Then, xR application 401 may determine the user's proximity to SLAM landmarks for "planned" objects—that is, objects which were in environment 100 during calibration and/or are present in ORDB 402 as recognized. xR application 401 may also enable adding, removing, or training for "unplanned" objects.

In some implementations, systems and methods described herein may associate each object with one or more safety levels depending upon the physical distance(s) between the object and the user or HMD, as at least one or more of the object's features is tracked as a landmark in the SLAM-mapped space.

In steady-state, xR application 401 takes SLAM data and IMU data, performs object recognition using frames from WF camera 108, associates recognized "planned" objects with SLAM landmarks, assigns safety levels with distances, and detects/learns unplanned objects. Then, xR application 401 may overlay safety information on rendered frames displayed by HMD 102, or it may turn off the HMD's display (e.g., to show the user a live feed from WF camera 108 feed in extreme emergency situations).

Object tracking and recognition module 408 may implement any object identification or detection technique based on visual images (e.g., images captured in the visible spectrum), including, but not limited to: edge detection, corner detection, blob detection, ridge detection, or the like. In some cases, object tracking and recognition module 408 may operate in conjunction with SLAM module 403 to detect the position or movement of a real-world object, originally identified using RGB camera 108, and tracked one or more SLAM landmarks obtained with an IR/NIR sensor or camera (and associated with that object).

Database 402 may include if/then rules with real-world objects and their location, orientation, and/or movement (e.g., angle(s), height(s), direction(s), trajector(ies), speed(s), etc.). In some cases, an if/then rule catalog may be filtered based upon the presence or identification of a master object and/or other surrounding, secondary objects in the user's FOV. Database 402 may include different rule catalogs based upon the identity of an authenticated user, for example, as part of a profile. Additionally, or alternatively, rules may be based upon historical usage.

In some cases, if/then rules in database 402 may be based upon the user's whole environment, such that same object and action can mean something different at home and work, or may not be performed if the user is in a forbidden environment. For example, if/then rules may take into consideration people in the user's FOV or around the user (e.g., boss or kids in the surrounding), and/or landmarks (objects around the master object) in the FOV and their location.

Figure 5A:
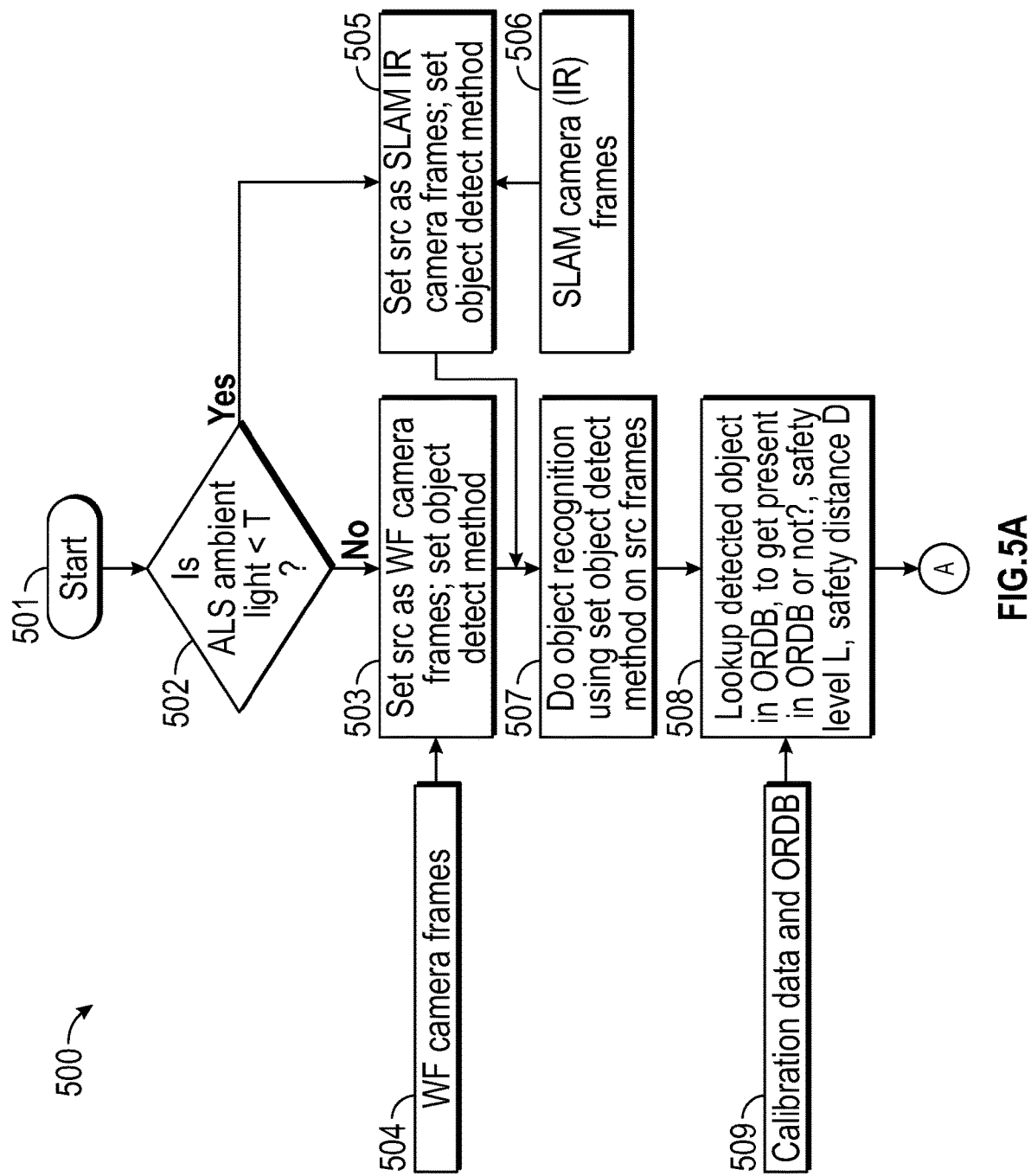
FIGS. 5A and 5B illustrate an example of a method for providing context-aware hazard detection using world-facing cameras in xR applications, according to some embodiments.
Figure 5B:
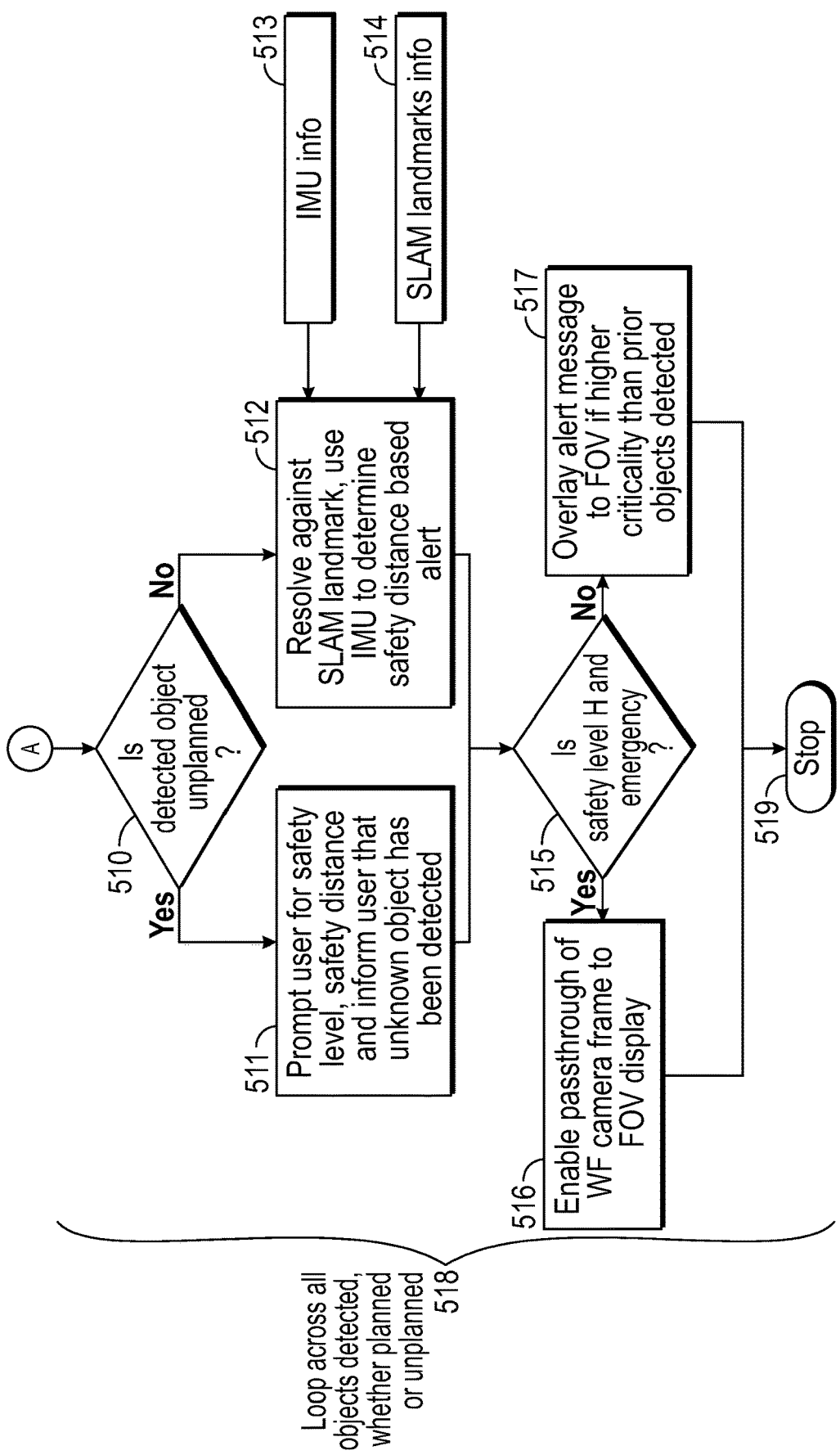

FIGS. 5A and 5B illustrate method 500 which, in operation, provides context-aware hazard detection using WF cameras 108 in xR application 401. In various embodiments, method 500 may be performed by xR application 401 in cooperation with object tracking and recognition module 408 and SLAM module 403, based upon the execution of program instructions and/or other information stored in database 402.

Particularly, method 500 starts at block 501. At block 502, method 500 determines if the ambient light around HMD 102 is below a minimum level sufficient to obtain and process images in the visible spectrum from RGB camera 108 (e.g., using an ambient light sensor (ALS) mounted on HMD 102 as one of sensor(s) 202). If not, block 503 sets WF camera 108 as a capture source for object recognition, and executes object tracking and recognition module 408 upon one or more captured RGB frames 504 to identify one or more hazardous objects in those frames. Otherwise, block 505 sets a SLAM IR camera as the capture source for object recognition, and uses one or more IR frames 506 to identify objects.

Block 507 performs object recognition upon frames obtained via the selected capture source. For example, in the case of RGB frames 504, object tracking and recognition module 408 may calculate differences between RGB level histograms corresponding to a target (or candidate) object, and set of one or more template objects, referred to as "object models" and stored in database 402. When these differences are within selected amount, the target or candidate object may be recognized as an instance of the object model (or a "match").

As such, block 508 compares calibration and object model data 509 received from database 402 (ORDB) against objects detected in the incoming frames 504 or 506. At block 510, if the comparison yields a match, then the target object is recognized as a "planned" object (that is, an object for which there is a corresponding object model already stored in database 402).

In that case, block 512 associates the recognized object with a selected SLAM landmark—after this, method 500 tracks the selected SLAM landmark to identify safety hazards in the user's environment 100. For example, block 508 may transform the coordinate system or reference used to identify the object using WF camera 108 into a different coordinate system or reference used by SLAM module 403, such that one or more SLAM landmark(s) closest in Euclidian distance to the real-world object is/are selected. In some cases, the selected SLAM landmark(s) may overlay the object. In other cases, the selected SLAM landmark(s) may be at a different position than the real-world object, and distance(s) between the selected SLAM landmark(s) and the real-world object may be recorded.

As the user and/or the object moves around in environment 100, data from IMU sensors 513 and/or SLAM landmarks 514 may be used to track the object, and different "if/then" rules may be applied to alert the user in response to detection of a safety hazard. For example, when the object is planned, a corresponding object model stored in database 402 may include metadata associated with the object, such as a severity value associated with the object, a safe or unsafe distance for user 101 to maintain from the object, a safe or unsafe height (e.g., from the ground or another horizontal surface; which may be tracked using other SLAM landmark(s)), a safe or unsafe speed, velocity, acceleration, trajectory for the object, etc.

For example, in some implementations, severity values associated with each object model may range between 1 and 5, depending upon the degree of potential injury to user 101, such that an electrical transformer in environment 100 that is known to operate with large electrical currents or voltages may be rated a "5" (or "high"); whereas a small chemical container with product known to cause only mild skin irritation may be rated a "1" (or "low"). In other implementations, the same real-world object may have different severity values for different users, depending upon the individual characteristics of each user (e.g., an individual's height, arm's length, allergies, eye or other visual conditions, etc.), and which may be stored in a user profile, for example, in database 402.

When block 510 detects an object that is not planned; that is, is not already stored in database 402, block 511 may operate to monitor the object and add a corresponding object model to database 402. For example, block 511 may inform user 101 that an unplanned object has been detected, and it may request user 101 to enter a severity level, distance, or other safety parameter for the unplanned object via an UI of xR application 401. Then, block 511 may store the user-provided information as metadata long with along with RGB histogram information for the object model.

At block 515, method 500 determines if the present distances and parameters for an identified object are within bounds established in database 402 for that object. For example, if a safe distance from a real-world object is 4 feet from user 101, and user 101 is 3 feet away from the selected SLAM landmark associated with the object, block 515 may trigger the safety notification of block 517. Additionally, or alternatively, if a safe height from the ground for a real-world object is zero (i.e., a cable that should be lying flat on the floor), but SLAM landmarks associated with the object have moved 1 foot up in the air during execution of xR application 401 (as the cable became a physical tripping hazard for immersed user 101 walking around environment 100), block 515 may also trigger the safety notification of block 517.

In some cases, if violation of a safety distance or other parameter is further labeled as an "emergency" (versus a "non-emergency") for a particular object model stored in database 402, then block 516 may enable passthrough of the WF camera feed to HMD 102, whereby frame data may be overlaid and/or enhanced (e.g., a section magnified or highlighted, etc.) for AR and MR, as well as VR, in situations that may require a more immediate user response.

As to the safety notification, block 517 may provide a safety instruction related to the detected object, for example, in response to a distance between the user and a SLAM landmark associated with the object meeting a distance threshold. In some cases, the safety instruction may be provided audibly, using internal speakers built into HMD 102.

Additionally, or alternatively, the safely instruction may be provided visually through the HMD's display. For example, block 517 may render an image (e.g., a dialog box and/or icons) selected based upon a severity value (e.g., 1 through 5) associated with the detected object. Each different image may include different textual instructions (e.g., "DANGER: HIGH VOLTAGE" versus "watch your step"), graphics, colors, animations, etc. In some cases, the image may include an outline of the detected object overlaying the object, in a manner that highlights the presence of the safety hazard among other objects in environment 100.

Method 500 ends at block 519, after block 518 creates a loop around blocks 510-517, so that all objects detected with WF camera 108 are properly handled.

In some implementations, while method 500 is under execution HMD 102 and/or host IHS 103 may monitor its hardware resource utilization (e.g., compute or processing utilization, memory usage, etc.). In response to the resource utilization reaching a maximum, HMD 102 and/or host IHS 103 may reduce the number of SLAM landmarks used to determine the position of the HMD 102 by eliminating one or more such landmarks with lower Kalman Gain values than those retained. In those cases, method 500 may request SLAM module 403 that a selected SLAM landmark (associated with a detected object) be maintained within the tracked set of landmarks, even if the selected SLAM landmark has a low Kalman Gain, in response to a severity value of the SLAM landmark/object model being above a safety threshold (e.g., any landmark associated with an object having a severity value of 4 or above, in a 1-5 scale, continues to be tracked, regardless of it having a low confidence or "G" value).

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive a frame from a camera mounted on a Head-Mounted Display (HMD) worn by a user;
associate an object detected in the frame with a Simultaneous Localization and Mapping (SLAM) landmark extracted from an infra-red (IR) image;
request that the SLAM landmark be maintained within a tracked set of SLAM landmarks;
in response to a resource utilization reaching a selected value, reduce the tracked set of SLAM landmarks by eliminating one or more SLAM landmarks with low Kalman Gains;
retain the requested SLAM landmark, wherein the requested SLAM landmark has a lower Kalman Gain than the eliminated one or more SLAM landmarks; and provide to the user, via the HMD, a safety instruction in response to a distance between the user and the SLAM landmark meeting a threshold.

2. The IHS of claim 1, wherein the frame is received from a World-Facing (WF) camera mounted on the HMD.

3. The IHS of claim 2, wherein the requested SLAM landmark is detected using an Infra-Red (IR) or near-IR (NIR) camera decoupled from the HMD.

4. The IHS of claim 2, wherein the object is detected in the frame using a feature extraction process.

5. The IHS of claim 4, wherein one or more extracted features match one or more corresponding features of an object model stored in a database.

6. The IHS of claim 5, wherein the database indicates, for the object model, a plurality of different severity values, each of the severity values associated with a different user identity, wherein providing the safety instruction further comprises rendering an image for display by the HMD corresponding to a severity value associated with the user.

7. The IHS of claim 6, wherein the program instructions, upon execution by the processor, further cause the IHS to track a height of the object relative to the ground based upon the requested SLAM landmark.

8. The IHS of claim 7, wherein the severity value associated with the user is based upon a height of the user, and wherein the safety instruction is provided, in part, in response to the object being located above a selected height from the ground.

9. The IHS of claim 6, wherein the program instructions, upon execution by the processor, further cause the IHS to track a speed of the object based upon the requested SLAM landmark.

10. The IHS of claim 9, wherein the severity value is proportional to the speed.

11. The IHS of claim 6, wherein the program instructions, upon execution, further cause the IHS to, in response to an IHS resource utilization reaching a predetermined value, reduce the number of landmarks used to determine the position of the HMD.

12. The IHS of claim 11, wherein the program instructions, upon execution, further cause the IHS to, maintain the requested SLAM landmark among the used landmarks in response to the severity value being above a safety threshold.

13. The IHS of claim 6, wherein rendering the image further comprises providing a feed of camera frames from the WF camera to a display within the HMD.

14. A hardware memory device having program instructions stored thereon that, upon execution by a Head-Mounted Display (HMD) worn by a user during execution of a Virtual, Augmented, or Mixed Reality (xR) application, cause the HMD to:
receive a frame from a camera mounted on a Head-Mounted Display (HMD) worn by a user;
associate an object detected in the frame with a Simultaneous Localization and Mapping (SLAM) landmark extracted from an infra-red (IR) image;
request that the SLAM landmark be maintained within a tracked set of SLAM landmarks;
in response to a resource utilization reaching a selected value, reduce the tracked set of SLAM landmarks by eliminating one or more SLAM landmarks with low Kalman Gains;
retain the requested SLAM landmark, wherein the requested SLAM landmark has a lower Kalman Gain than the eliminated one or more SLAM landmarks; and
provide to the user, via the HMD, a safety instruction in response to a distance between the user and the SLAM landmark meeting a threshold.

15. The hardware memory device of claim 14, wherein the detected object is associated with a severity value, and wherein providing the safety instruction further comprises selecting an image corresponding to a severity value associated with the detected object.

16. The hardware memory device of claim 15, wherein the program instructions, upon execution, further cause the HMD to track a height or speed of the detected object based upon the requested SLAM landmark.

17. The hardware memory device of claim 15, wherein the object comprises a chemical, and wherein the severity value is based upon an allergy of the user to the chemical.

18. A method, comprising:
receiving a frame from a camera mounted on a Head-Mounted Display (HMD) worn by a user;
associating an object detected in the frame with a Simultaneous Localization and Mapping (SLAM) landmark extracted from an infra-red (IR) image;
requesting that the SLAM landmark be maintained within a tracked set of SLAM landmarks;
in response to a resource utilization reaching a selected value, reducing the tracked set of SLAM landmarks by eliminating one or more SLAM landmarks with low Kalman Gains;
retaining the requested SLAM landmark, wherein the requested SLAM landmark has a lower Kalman Gain than the eliminated one or more SLAM landmarks; and
providing to the user, via the HMD, a safety instruction in response to a distance between the user and the SLAM landmark meeting a threshold.

19. The method of claim 18, further comprising:
tracking a height or speed of the detected object using the SLAM landmark;
associating a severity value with the object based upon the height or speed; and
providing a notification to the user corresponding to the severity value.

* * * * *